July 2, 1935.    R. C. F. KURTZE    2,006,835
ELECTRIC SEAM WELDING APPARATUS
Filed Nov. 25, 1932
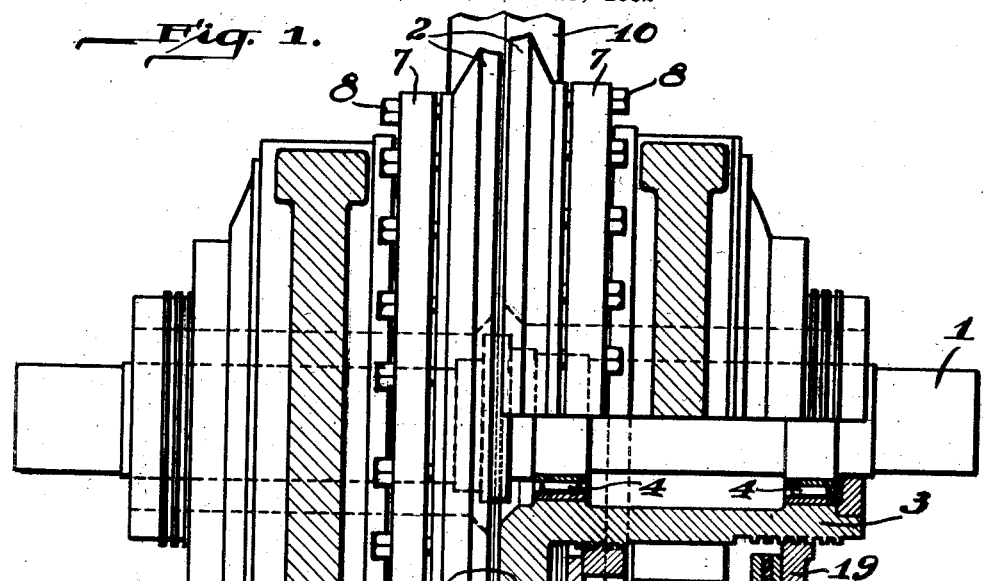
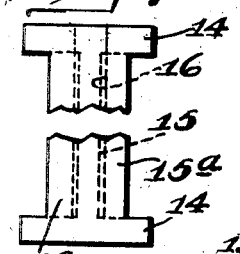
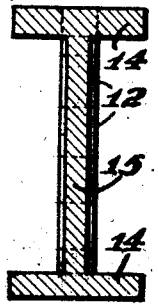
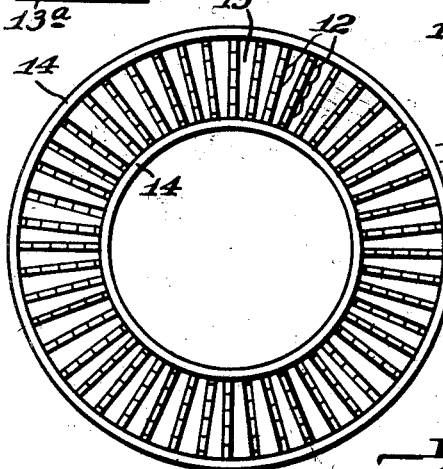
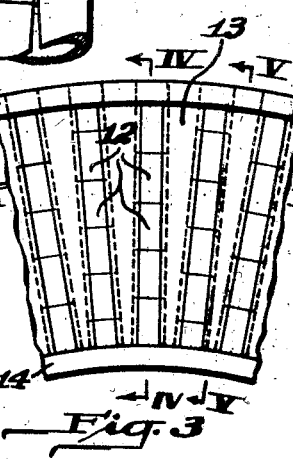
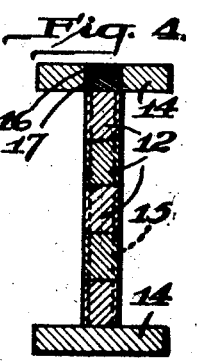
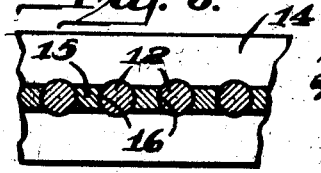

Patented July 2, 1935

2,006,835

UNITED STATES PATENT OFFICE 2,006,835

ELECTRIC SEAM WELDING APPARATUS

Reimar C. F. Kurtze, Youngstown, Ohio; Arthur Morgan, administrator of said Reimar C. F. Kurtze, deceased; assignor to Republic Steel Corporation, Youngstown, Ohio, a corporation of New Jersey Application November 25, 1932, Serial No. 644,213

9 Claims. (Cl. 219—6)

This invention relates to electric seam welding apparatus, and it is one of its major objects to provide such apparatus with improved means for conducting electric current to the electrodes from the transformer.

Commercial electric butt seam welding apparatus embodies a pair of roller electrodes which straddle the seam to be welded and which pass welding current thereacross to bring the open seam to welding heat. The welding current is conventionally supplied to the electrodes from a transformer, and as far as I am aware all commercial apparatuses have used drag brush means for this purpose. Such means are not particularly satisfactory, and they become especially disadvantageous in the light of the present trend toward seam welding large diameter pipe of heavy wall thickness. The heavy currents used require a large brush contact surface and the application of very heavy pressures to the brushes. The inefficiency of brush transfer entails current losses, which may be serious and the heavy brush pressures cause wearing away of the electrode surfaces, and of the brushes, thus requiring their replacement at intervals. This increases operating and overhead expenses. These and other disadvantages have militated against such contact means, but up to the time of this invention no practical and acceptable substitute has been available.

This invention provides contact means for carrying current from the transformer secondary of seam welding apparatus to the electrodes which overcome the foregoing and other disadvantages of the means previously used for that purpose. In accordance with the invention electric current is conducted from a stationary transformer secondary terminal to the roller electrode by means of cylindrical rollers acting as a type of thrust roller bearing between the electrode and terminal. The cylindrical rollers are mounted radially of the electrode, suitably in a guide plate, and the bearing thus provided is clamped in any suitable manner between the stationary terminal and the roller electrode to permit relative movement therebetween, the clamping pressure being suitably adjusted to provide good electrical contact.

Although the radially disposed cylindrical rollers used in the practice of the invention may not, and ordinarily do not, provide a true rolling contact, they provide a type of thrust roller bearing, and may be so referred to herein for brevity. In accordance with the invention a large number of such rollers are used, so as to provide a large total line contact. This minimizes the impedance or reactance, and the rollers carry the heavy current loads necessary for welding without becoming overheated and thereby damaged.

The invention may be explained further in connection with the accompanying drawing, in which Fig. 1 is a plan view, partly in section, of one form of roller electrode showing the preferred embodiment of the invention; Fig. 2 a front view on an enlarged scale of the current-carrying bearing shown in Fig. 1; Fig. 3 a fragmentary view of Fig. 2, on an enlarged scale; Figs. 4 to 6 sectional views of Fig. 3, taken on lines IV—IV, V—V and VI—VI, respectively; and Fig. 7 a detail showing the manner of making the guide plate shown in Figs. 2 to 6.

The invention is applicable generally to seam welding apparatus comprising roller electrodes and stationary transformer secondaries. The electrode assembly shown, for purposes of illustration, comprises a fixed shaft I mounted in a suitable frame to support a pair of roller electrodes 2 over the work, with the electrodes straddling the seam in the manner customary in the art. The electrodes are of identical construction. Each comprises a sleeve 3 rotatably mounted on shaft I, as by means of roller bearings 4. The electrode proper comprises a copper ring 5 mounted peripherally of a flange 6 formed at the inner end of sleeve 3. Electrode ring 5 is replaceably held in position by means of a wedge ring 7, whereby the electrode ring is replaceable, either to substitute a new ring, or to replace it with larger or smaller rings for welding pipe of different sizes. Rings 5 and 7 are connected in any desired manner, for example by means of bolts 8. The electrode is insulated from sleeve I by means of insulation 13 interposed between wedge ring 7 and flange 6.

It will be observed from Fig. 1 that shaft I is offset between the electrodes, whereby the electrodes are similarly offset longitudinally of each other and the seam 9 of the pipe 10 being welded. In the use of this apparatus the current does not flow directly across the seam, but by virtue of the offsetting of the electrodes the impulses follow diffused paths, and each longitudinal increment of the seam is traversed by a plurality of impulses flowing in such paths. This provides uniformity of heating in bringing the seam up to welding heat, and as a consequence the welded seam is of maximum uniformity and homogeneity. No claim is made herein to the method of welding with such offset electrodes, nor to apparatus embodying them, these being the subject of a copending application, Serial No. 582,711, filed by me on December 23, 1931.

Annularly surrounding shaft 1 adjacent the electrode is a transformer secondary terminal 11. In accordance with the invention current is conducted from secondary terminal 11 to the electrode by a roller thrust bearing comprising cylindrical rollers 12 clamped between the electrode and the terminal. The use of cylindrical rollers provides several important advantages. For instance, they may be arranged to act as a thrust bearing, which simplifies construction, as compared with true roller, or conical bearings, and with such thrust type bearings the pressure may be adjusted and continuously maintained. An important advantage lies in the ability to provide adequate line contact for carrying the welding current. The modern trend is to apply resistance seam welding to pipe of large diameter and heavy wall, which necessitates the use of exceedingly heavy currents, up to 150,000 amperes, for example. Such current strength imposes severe conditions on current contacts, because impedance and reactance losses become of major importance. Practical considerations also demand that with roller current carrying contacts, which provide line contact, the current should not exceed about 150 amperes per linear inch. My invention, embodying cylindrical rollers arranged radially of the electrode, makes it possible to provide adequate total line contact to meet all such conditions, where this has not been possible or practicable, as from an engineering or economic standpoint, heretofore.

The preferred bearing is shown in detail in Figs. 2 to 7, although other constructions may be used if desired. In this embodiment rollers 12 are mounted in an annulus 13 of I-section. As shown in Fig. 1, the web of the annulus is disposed between adjacent faces of wedge ring 7 and terminal 11, and its flanges 14 act as retaining members to restrain slippage relative thereto. The annulus is provided with radial bores which are open along the web faces, so that rollers 12 positioned in the bores project therefrom for contact with the electrode and secondary terminal.

Such guide plates are made conveniently from an annulus 13a, Fig. 7, whose web 15a is of substantially greater thickness than the web 15 of the completed guide plate. Bores 16 are drilled radially into the web from the outer flange, and the web faces are then machined down uniformly to open the bores longitudinally of the web faces. The bores are opened sufficiently to permit the rollers 12 to project the necessary distance, but the width of the openings is less than the diameter of the bores. The extent to which the web faces are machined down is indicated in Fig. 7 by dotted lines 15, which correspond to the web of the completed guide plate of Figs. 2 to 6.

Rollers 12 are, of course, formed of material of good electrical conductivity, and most suitably they are solid, to resist crushing stresses, and are hard, to resist wear. The material sold under the name of "Tempaloy" is suitable for the purpose. The rollers are of a diameter such as to roll freely in bores 16 without undue lateral play. When inserted in the bores they project from the web faces, as shown in Figs. 5 and 6, so that when the bearing is clamped in the position shown in Fig. 1 they contact on opposite sides with wedge ring 7 and the secondary terminal 12, forming a roller thrust bearing which permits the electrode to rotate relative to the secondary.

The open ends of bores 16 may be closed by metallic plugs 17, Fig. 4, peened therein, or in any other suitable manner. Advantageously each roller 12 is made up of a plurality of short lengths, and the joints are staggered in successive rollers, as seen especially well in Fig. 3.

As an example of the invention reference may be made to bearings used in an electric seam welding apparatus for welding large diameter, heavy wall pipe, using a current of about 150,000 amperes. For this purpose 240 rollers each 5 inches in length are mounted radially in an annulus, as just described, to provide 1200 inches of line contact. Each roller is made up of 1-inch lengths of ¼" round rod, with shorter or longer lengths to effect staggering of joints. The annulus web in the completed plate is $\tfrac{7}{32}$ inch thick, whereby the rollers project sufficiently to form the bearing.

The bearing thus provided is clamped between secondary terminal 11 and the electrode 2, preferably under substantial pressure to maintain good electrical contact. Most suitably this is accomplished by thrust means acting upon the secondary terminal to continuously maintain the bearing under thrust. In the embodiment shown a resilient ring 18 is connected at one end to a nut 19 movable longitudinally of shaft 1, for example on sleeve 3. The ring is insulated from the nut by insulation 20, and its other end exerts thrust upon the outer face of terminal 11. In this manner the pressure can be adjusted according to need, and any wear of the parts is compensated for by the resiliency of thrust ring 18, which continuously maintains thrust pressure. In the specific example given a total thrust of 6 tons, equivalent to 10 pounds per linear inch of roller line contact, may be used.

The invention thus provides simple and efficient current transfer means which overcome or minimize the disadvantages of means previously used. Adequate line contact and pressures are provided, so that the reactance and current impedance are kept within practical limits, and the current loop is kept at a minimum. The excessive wear and inefficiency of drag brush and plain sliding contact transfer means are avoided. Other advantages will appear to those skilled in the art.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. In an electric seam welding apparatus the combination with a frame, a fixed shaft mounted in said frame, a sleeve mounted rotatably upon said shaft and provided at its inner end with an outwardly extending flange, an electrode ring peripherally connected to said flange, a stationary transformer secondary terminal supported annularly of said sleeve, a current-conducting bearing mounted between adjacent faces of said electrode and terminal and comprising a plurality of current-carrying rollers disposed radially thereof, a thrust nut mounted on the outer end of said sleeve for movement longitudinally thereof, and a spring acting between said nut and terminal to exert thrust upon the terminal and continuously maintain the electrode, bearing and terminal in good electrical contact.

2. In an electric seam welding apparatus the combination of a frame, a shaft carried by said frame, a roller electrode mounted on said shaft, a transformer having a stationary secondary terminal supported annularly of said shaft, and roller contact means disposed between and in electrical contact with said electrode and secondary for carrying electric current directly to the electrode from said transformer, said means comprising a circular plate having a plurality of substantially cylindrical radial bores which are longitudinally open at opposite faces of the plate for a width less than the diameter of the bores, and current-carrying cylindrical rollers disposed in said bores and projecting from the faces of the plate through the bore openings, said plate being mounted between the electrode and terminal with said rollers in good electrical contact therewith and providing a large total current-carrying line contact.

3. In an electric seam welding apparatus the combination of a frame, a shaft carried by said frame, a roller electrode mounted on said shaft, a stationary transformer secondary terminal annularly surrounding said shaft, and roller contact means disposed between and in electrical contact with said electrode and secondary terminal for carrying electric current directly to the electrode from said terminal, said means comprising an annulus having a plurality of substantially cylindrical radial bores open longitudinally at opposite faces of the annulus for a width less than the diameter of the bore, current-carrying cylindrical rollers disposed in said bores and projecting from said faces through said openings, said annulus being mounted between the electrode and terminal, and means acting upon said terminal to continuously maintain the bearing under thrust.

4. In an electric seam welding apparatus, the combination with a roller electrode and a stationary transformer secondary terminal, of roller contact means for conducting electric current to said electrode from said terminal comprising a plurality of cylindrical current-carrying rollers disposed radially of said electrode between and in contact with the electrode and terminal and providing a large total current-carrying line contact, and means cooperating with said rollers to hold them fixed against movement radially of the electrode and terminal.

5. In an electric seam welding apparatus, the combination with a roller electrode and a stationary transformer secondary terminal, of roller contact means for conducting electric current to said electrode from said terminal comprising a plurality of cylindrical current-carrying rollers disposed radially of said electrode between and in contact with the electrode and terminal and providing a total current-carrying line contact such that the current carried by the rollers does not exceed 150 amperes per linear inch of line contact, and means cooperating with said rollers to hold them fixed against movement radially of the electrode and terminal.

6. In an electric seam welding apparatus, the combination with a roller electrode and a stationary transformer secondary terminal, of roller contact means for conducting electric current to said electrode from said terminal comprising a plurality of cylindrical current-carrying rollers disposed radially of said electrode in contact with it and said terminal and providing a large total current-carrying line contact therebetween, and cage means engaging said rollers at their ends to hold them fixed against movement radially of the electrode and terminal.

7. In an electric seam welding apparatus, the combination with a roller electrode and a stationary transformer secondary terminal, of roller contact means for conducting electric current to said electrode from said terminal comprising a plurality of cylindrical current-carrying rollers disposed radially of said electrode in contact with it and said terminal and providing a large total current-carrying line contact therebetween, cage means engaging said rollers at their ends to hold them fixed against movement radially of the electrode and terminal, and means acting upon said terminal to continuously maintain the rollers under thrust between the electrode and terminal.

8. In an electric seam welding apparatus, the combination of a roller electrode, a shaft supporting said electrode, a stationary transformer secondary terminal disposed annularly of said shaft substantially parallel to said electrode, roller contact means for conducting electric current from said terminal to said electrode including a plurality of cylindrical current-carrying rollers disposed radially between and in contact with said electrode and the face of the terminal and substantially coextensive in length with the face of said terminal, said rollers providing a large total current-carrying line contact, and means cooperating with said rollers to hold them fixed against movement radially of the electrode and terminal.

9. In an electric seam welding apparatus, the combination of a roller electrode, a shaft supporting said electrode, a stationary transformer secondary terminal disposed annularly of said shaft substantially parallel to said electrode, roller contact means for conducting electric current from said terminal to said electrode including a plurality of cylindrical current-carrying rollers disposed radially between and in contact with said electrode and the face of the terminal and substantially coextensive in length with said terminal, the face of said rollers providing a total line contact such that the current carried does not exceed about 150 amperes per linear inch of contact, means cooperating with said rollers to hold them fixed against movement radially of the electrode and terminal, and means acting upon said terminal to maintain thrust upon said rollers.

REIMAR C. F. KURTZE.